United States Patent
Friedrich et al.

(10) Patent No.: US 11,897,440 B2
(45) Date of Patent: Feb. 13, 2024

(54) CONTROLLABLE ACTUATOR DEVICE, BRAKING DEVICE FOR AN ELECTRICALLY OPERATED VEHICLE, AND METHOD FOR OPERATING A BRAKING DEVICE

(71) Applicant: Robert Bosch GmbH, Stuttgart (DE)

(72) Inventors: Thomas Friedrich, Ingersheim (DE); Heinz-Bernd Haiser, Ludwigsburg (DE)

(73) Assignee: Robert Bosch GmbH, Stuttgart (DE)

( * ) Notice: Subject to any disclaimer, the term of this patent is extended or adjusted under 35 U.S.C. 154(b) by 535 days.

(21) Appl. No.: 17/259,318

(22) PCT Filed: Jun. 26, 2019

(86) PCT No.: PCT/EP2019/066988
§ 371 (c)(1),
(2) Date: Jan. 11, 2021

(87) PCT Pub. No.: WO2020/011536
PCT Pub. Date: Jan. 16, 2020

(65) Prior Publication Data
US 2021/0253075 A1    Aug. 19, 2021

(30) Foreign Application Priority Data
Jul. 9, 2018    (DE) .................... 10 2018 211 298.3

(51) Int. Cl.
*B60T 13/58*    (2006.01)
*B60T 1/00*    (2006.01)
(Continued)

(52) U.S. Cl.
CPC .............. *B60T 13/58* (2013.01); *B60T 1/005* (2013.01); *B60T 1/062* (2013.01); *B60T 7/12* (2013.01);
(Continued)

(58) Field of Classification Search
CPC .......... B60T 13/58; B60T 1/005; B60T 1/062; B60T 13/741; B60T 7/12; B60T 2270/402; F16D 2121/24; F16D 63/006
See application file for complete search history.

(56) References Cited

U.S. PATENT DOCUMENTS

2008/0129109 A1*   6/2008   Schuh .................. F16D 63/006
                                                                303/9.61
2013/0268171 A1    10/2013  Huls et al.
(Continued)

FOREIGN PATENT DOCUMENTS

CN          101224746 A       7/2008
CN          101670832 A       3/2010
(Continued)

OTHER PUBLICATIONS

German Patent No. DE 102020211436 to Friedrich et al published Mar. 17, 2022.*
(Continued)

*Primary Examiner* — Pamela Rodriguez
(74) *Attorney, Agent, or Firm* — Michael Best & Friedrich LLP

(57) ABSTRACT

A controllable actuator unit (1) having an electronic connecting device (AN). The actuator device (1) is connectable to a drive axle of an electrically operated vehicle (2), such that a braking or locking effect for a rotary movement of the drive axle can be produced. The actuator device (1) is controllable by a control device (SE) via the electronic connecting device (AN).

12 Claims, 1 Drawing Sheet

(51) Int. Cl.
    *B60T 1/06*          (2006.01)
    *B60T 7/12*          (2006.01)
    *B60T 13/74*        (2006.01)
    *F16D 63/00*        (2006.01)
    *F16D 121/24*       (2012.01)

(52) U.S. Cl.
    CPC .......... *B60T 13/741* (2013.01); *F16D 63/006* (2013.01); *B60T 2270/402* (2013.01); *F16D 2121/24* (2013.01)

(56) References Cited

U.S. PATENT DOCUMENTS

2019/0383391 A1* 12/2019 Merwin ................ F16D 63/006
2020/0149631 A1* 5/2020 Tachibanada ........... B60T 1/005

FOREIGN PATENT DOCUMENTS

| | | |
|---|---|---|
| CN | 107054316 | 8/2017 |
| CN | 107406060 A | 11/2017 |
| DE | 10234848 | 2/2004 |
| DE | 102007019441 | 10/2008 |
| FR | 2841317 | 12/2003 |
| WO | 2012136436 A2 | 10/2012 |

OTHER PUBLICATIONS

Translation of German Patent No. DE 102007019441 obtained from website: https://worldwide.espacenet.com on Jul. 20, 2023.*
International Search Report for Application No. PCT/EP2019/066988 dated Apr. 18, 2019 (English Translation, 2 pages).

* cited by examiner

CONTROLLABLE ACTUATOR DEVICE, BRAKING DEVICE FOR AN ELECTRICALLY OPERATED VEHICLE, AND METHOD FOR OPERATING A BRAKING DEVICE

BACKGROUND OF THE INVENTION

The present invention relates to a controllable actuator device, a brake device for an electrically operated vehicle, and a method for operating a brake device.

In vehicles with internal combustion engines and multiple gears, brake systems are usually available for redundancy, using which deenergized holding can be achievable. Usually a handbrake with corresponding actuators or automatic parking brakes (APB) is used. The redundancy for the braking effect can be achieved by engaging a gear, i.e. by means of the gearbox. On the other hand, it is also possible that the redundancy can be achieved by means of a parking lock or a locking pawl in an automatic transmission.

In the case of electric vehicles with a single-speed transmission, there is sometimes no parking lock or locking pawl or no actuator for redundancy available in the brake system or drive train.

In DE 102 34 848 Al an electromechanical brake device with a locking device is described. The brake device has a freewheel and can be equipped with a locking pawl.

SUMMARY OF THE INVENTION

The present invention creates a controllable actuator device according to the invention, a brake device for an electrically operated vehicle according to the invention and a method for operating a brake device according to the invention.

Preferred developments are the subject matter of the subordinate claims.

The idea underlying the present invention is to create a controllable actuator device, a brake device for an electrically operated vehicle with an actuator device and a method for operating a brake device for an electrically operated vehicle, wherein a redundancy in the braking performance of electric vehicles may be achieved, wherein a controller of the actuator as a redundant brake component can be controlled by means of the on-board electronics.

According to the invention, the controllable actuator device comprises an electronic connection device, wherein the actuator device can be connected to a drive axle of an electrically operated vehicle, thereby a braking effect or a locking effect for a rotational movement of the drive axle can be produced, wherein the actuator device can be controlled by a control device via the electronic connection device.

The control device can be advantageously installed in an electric vehicle. As a result, an actuator device which usually has its own control system and a therefore necessary separate bus connection (for example, a CAN bus), can advantageously be replaced by an actuator device which can be controlled directly by a controller in the vehicle, for example by the controller of the brake system, and does not require a special bus connection and costs are reduced.

Highly automated vehicles with such actuators which are advantageously on the road without a driver or can even park themselves (for example as valet parking), can provide full redundancy for holding mechanisms or braking mechanisms and need not rely on the automatic parking brake alone.

Owing to the possibility of controlling the actuator device by a control device which advantageously may be located outside or apart from the actuator device, the necessary hardware and software for controlling the actuator device may be omitted to a lesser extent. In this way, advantageously costs can be reduced and a robust and redundant holding and/or a redundant brake device can be achieved, which advantageously may comprise a locking pawl as an adjustable and controllable actuator.

According to a preferred embodiment of the controllable actuator device, this is in the form of a locking pawl.

The use of a locking pawl as an actuator advantageously offers a cost-effective way to realize a controllable actuator in a brake device.

According to a preferred embodiment of the controllable actuator device, this includes an electric motor for actuating the locking pawl.

According to a preferred embodiment of the controllable actuator device, this comprises a clamp by means of which a frictional connection to the drive axle can be established.

According to a preferred embodiment of the controllable actuator device, this comprises a bolt, by means of which a shape-locking connection to the drive axle can be produced.

According to a preferred embodiment of the controllable actuator device, the frictional connection and/or the shape-locking connection can be established with a disc, which is axially rotatably connected to the drive axle and is connected to it by shape locking or friction locking. The disc may be a brake disc.

According to the invention the brake device for an electrically operated vehicle comprises a controllable actuator device according to the invention; a first brake system and a control device which can be connected to the actuator device via the connection device and which is connected to the first brake system and the actuator device and the first brake system can be controlled by the control device.

The control of the actuator device is advantageously carried out in an already existing control device of the vehicle and is advantageously carried out simply after the connection device, which is advantageously in the form of an interface, has been connected to a signal line. The control of the actuator device is simplified and advantageous, since the necessary switching and control logic as well as hardware components can already be present in the control device in the vehicle. The control device is advantageously also set up for control of the (hydraulic) brake system and can therefore, for example, already include an ASIL-D (automotive safety integrity level D) standard (ISO 26262) or corresponding hardware and can ensure a high level of functional reliability for actuating the brake and actuator device. A design for such a hardware component or a provision of such an ASIL-D standard in a control device in the actuator device itself can be advantageously dispensed with.

The control of the actuator device is advantageously hardwired, i.e. via a signal line.

By shifting the control components to the control device, which can be a brake system control unit, and due to the connection to a signal line, the cost of such a brake device can be advantageously reduced.

According to a preferred embodiment of the brake device, this comprises a second brake system which is connected to the control device and which can be controlled by it.

According to a preferred embodiment of the brake device, the second brake system will include an automatic parking brake for at least one wheel of the electrically operated vehicle.

The automatic parking brake (APB) can, for example, comprise a motor-gearbox unit. This can be mounted at least on both brake calipers on one axle of the vehicle, for example on the rear axle. The control device can advantageously control, actuate, or switch off the second brake system. Here, the control device may include a driving stability device (ESP), in which advantageously there may be an ASIC (user software or application-oriented integrated circuit) for the parking brake.

According to a preferred embodiment of the brake device, the first brake system includes a hydraulic brake system for at least one wheel of the electric vehicle.

According to the invention, with the method for operating a brake device the following are carried out; the provision of a brake device according to the invention; activation of the first brake system and/or the second brake system by controlling by means of the control device; and activation of the controllable actuator device and generation of a braking effect or a locking effect for a rotational movement of a drive axle of an electrically operated vehicle by means of the control device.

Further features and advantages of embodiments of the invention can be derived from the following description with reference to the attached drawings.

BRIEF DESCRIPTION OF THE DRAWINGS

The present invention is explained in more detail below on the basis of the exemplary embodiment specified in the schematic figure of the drawing.

In the figures.

In the figures, the same reference characters denote the same or functionally identical elements.

DETAILED DESCRIPTION

Figure 1:
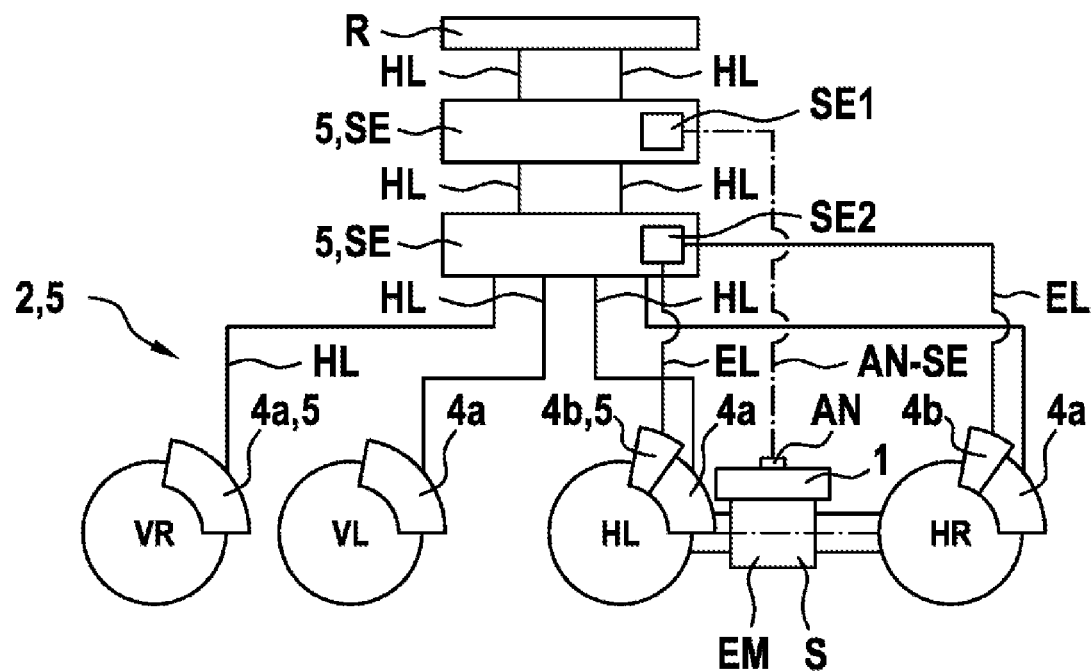
FIG. 1 shows a schematic representation of the brake device for an electrically operated vehicle according to an exemplary embodiment of the present invention with a controllable actuator device according to an exemplary embodiment of the present invention.

FIG. 1 shows a schematic representation of the brake device for an electrically operated vehicle according to an embodiment of the present invention with a controllable actuator device according to an embodiment of the present invention.

The brake device 5 for an electrically operated vehicle 2 comprises a controllable actuator device 1; a first brake system 4a; and a control device SE, which can be connected to the actuator device 1 via the connection device AN and which is connected to the first brake system 4a and the actuator device 1 and the first brake system 4a can be controlled by the control device SE.

The controllable actuator device comprises an electronic connection device AN, which can be connected to a drive axle of an electrically operated vehicle 2, whereby a braking effect or a locking effect for a rotational movement of the drive axle can be produced, wherein the actuator device 1 can be controlled by the control device SE via the electronic connection device AN. Furthermore, the brake device 5 may include a second brake system 4b, which is connected to and can be controlled by the control device SE. The second brake system 4b can comprise an automatic parking brake for at least one of the wheels VR; VL; HR; HL of the electrically operated vehicle 2. The first brake system 4a may comprise a hydraulic brake system for at least one wheel VR; VL; HR; HL of the electrically operated vehicle 2.

The rotational movement can result from a movement of the vehicle, such as rolling or driving. The connection device AN can be an interface or a plug for a signal line.

The first brake system 4a and the actuator device or the second brake system 4b and the actuator device 1 or all three together advantageously constitute a redundant brake device 5. Here, advantageously when activating a button for the automatic parking brake or in the case of a holding command from an automatic parking function, both the parking brake, or the second brake system 4b, and the actuator device 1 may advantageously be activated. Both the parking brake as well as the actuator device may advantageously comprise an electric motor, advantageously a low-power DC motor, which can advantageously achieve a large reduction, for example greater than 1:100, and a large force effect, for example a clamping force. From this, a relatively long locking time of, for example, one second can be achieved, similar to the parking brake. The locking time is the time required for the actuation, i.e. between the actuation command and the locked wheel/axle.

The control device SE can advantageously comprise a first channel with a first control device SE1 for the first brake system 4a. The first brake system can be connected as a hydraulic brake system to a reservoir R, through which a hydraulic system can be operated, for example with oil. The first control device SE1 can advantageously also control the actuator device 1 via the interface AN and can be connected to this via a cable AN-SE. The cable AN-SE can advantageously be designed for 12 V. The hydraulic brake system can advantageously include a brake caliper or other braking components on each wheel. The electric drive axle can be formed as a component with an electric machine EM, advantageously as an integrated drive axle, advantageously on the rear axle. The actuator device 1 is advantageously arranged on or integrated into this electric axle. The control device advantageously comprises a second control device SE2. The first and second control devices SE1 and SE2 can be formed as subcomponents of a control device SE or may be two separate control devices. The second control device SE2 is advantageously set up for controlling the second brake system 4b and can be equipped as with the first control device SE1 with an ASIC (Application Specific Integrated Circuit). The second control device SE2 can control the automatic parking brake, which may be advantageously mounted only on one axle (for example on the rear axle), and which acts on the brake calipers of the first brake system, for example on the same discs S. The designations HL and HR advantageously mean the left rear and right rear wheels, the designations VL and VR the left front and right front wheels. The second brake system 4b can be connected to the second control device SE2 with an electric cable EL. This can be advantageously designed for 12 V.

The brake device 5 can be advantageously used in highly automated electric vehicles.

The actuator device 1 as a locking pawl can advantageously produce a frictional connection with the drive axle, for example may include clamps. The function of the locking pawl is advantageously comparable to that of the APB. Owing to a larger reduction, the disc within the electric axle can be designed smaller, which can reduce the additional construction space and the additional weight. Therefore, the advantage may arise that due to the friction connection the locking pawl can be used for an emergency deceleration from low to medium speeds (thermal limitation). The locking pawl can advantageously also produce a shape-locking connection, for example by moving a bolt (axially or radially) to lock the disc S connected to the drive axle. Therefore, the advantage may arise that an even more favorable realization option may be achieved, because the clamping force can be maintained by the shape locking. The disc S, advantageously a brake disc, is not shown in FIG. 1 for reasons of clarity but may also be arranged within the electric axle (EM), so that the brake systems 4a, 4b and the actuator device 1 can act on it.

The reservoir R can be connected by hydraulic lines HL to the first brake system 4a, advantageously also to the control device SE.

In FIG. 1, a schematic connection of the reservoir R to the wheels and their first brake system 4a and second brake system 4b via hydraulic lines HL is shown. The hydraulic lines HL in FIG. 1 run under the control device SE (both blocks), but advantageously not through them. The first control device SE1 may be connected to a first on-board power channel and the second control device SE2 may be connected to a second on-board power channel.

Figure 2:
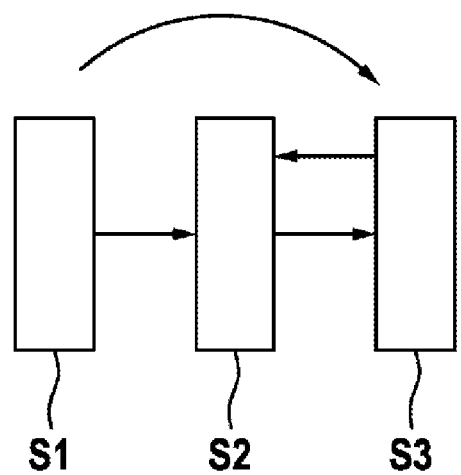
FIG. 2 shows a sequence of process steps according to an exemplary embodiment of the method of the present invention.

FIG. 2 shows a sequence of process steps according to an exemplary embodiment of the method of the present invention.

In the method for operating a brake device, the following are carried out: the provision SI of a brake device according to the invention; activation S2 of the first brake system and/or the second brake system by control by means of the control device; and activation S3 of the controllable actuator device and the generation of a braking effect or a locking effect for a rotational movement of a drive axle of an electrically operated vehicle by control by means of the control device.

Here it is possible that the process step S3 takes place first, i.e. activating the controllable actuator device and generating a braking effect or a locking effect, and the process step S2 takes place only after that, i.e. the activation of the first brake system and/or the second brake system by control by means of the control device.

Although the present invention has been fully described on the basis of the preferred exemplary embodiment above, it is not limited to this, but may be modified in various ways.

What is claimed is:

1. A brake device (5) for an electrically operated vehicle (2), comprising:
   a controllable actuator device (1) with an electronic connection device (AN), wherein the actuator device (1) is configured to be connected to a drive axle of the electrically operated vehicle (2), whereby a braking effect or a locking effect for a rotational movement of the drive axle can be produced;
   a first brake system (4a);
   a second brake system (4b); and
   a control device (SE) which is configured to be connected to the actuator device (1), via the connection device (AN), and which is also connected to the first brake system (4a) and the second brake system (4b), and wherein the actuator device (1), the first brake system (4a), and the second brake system (4b) are configured to be controlled by the control device (SE).

2. The brake device (5) as claimed in claim 1, wherein the controllable actuator device (1) comprises a locking pawl.

3. The brake device (5) as claimed in claim 2, wherein the controllable actuator device (1) comprises an electric motor for actuating the locking pawl.

4. The brake device (5) as claimed in claim 1, wherein the controllable actuator device (1) comprises a clamp, by means of which a friction connection to the drive axle can be produced.

5. The brake device (5) as claimed in claim 4, the controllable actuator device (1) further comprising a disc (S) configured to provide the friction connection, wherein the disc (S) is axially rotatably connected to the drive axle and is connected to the drive axle by force locking or shape locking.

6. The brake device (5) as claimed in claim 4, wherein the controllable actuator device (1) comprises a bolt, by means of which a shape-locking connection to the drive axle can be produced.

7. The brake device (5) as claimed in claim 6, the controllable actuator device (1) further comprising a disc (S) configured to provide the friction connection and the shape-locking connection, wherein the disc (S) is axially rotatably connected to the drive axle and is connected to the drive axle by force locking or shape locking.

8. The brake device (5) as claimed in claim 1, wherein the controllable actuator device (1) comprises a bolt, by means of which a shape-locking connection to the drive axle can be produced.

9. The brake device (5) as claimed in claim 8, the controllable actuator device (1) further comprising a disc (S) configured to provide the shape-locking connection, wherein the disc (S) is axially rotatably connected to the drive axle and is connected to the drive axle by force locking or shape locking.

10. The brake device (5) as claimed in claim 1, wherein the second brake system (4b) comprises an automatic parking brake for at least one wheel (VR; VL; HR; HL) of the electrically operated vehicle (2).

11. The brake device (5) as claimed in claim 1, wherein the first brake system (4a) comprises a hydraulic brake system for at least one wheel (VR; VL; HR; HL) of the electrically operated vehicle (2).

12. A method for operating the brake device (5), the method comprising the steps:
   providing (S1) the brake device (5) as claimed in claim 1;
   activating (S2) the first brake system (4a) and/or the second brake system (4b) by means of the control device (SE); and
   activating (S3) the controllable actuator device (1) and generating the braking effect or the locking effect for the rotational movement of the drive axle of the electrically operated vehicle (2) by means of the control device (SE).

* * * * *